US008146650B2

(12) United States Patent
Lohf et al.

(10) Patent No.: US 8,146,650 B2
(45) Date of Patent: Apr. 3, 2012

(54) MICROFLUIDIC SYSTEM

(75) Inventors: Astrid Lohf, Erlangen (DE); Waldemar Wenzel, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 547 days.

(21) Appl. No.: 11/989,177

(22) PCT Filed: Jul. 24, 2006

(86) PCT No.: PCT/EP2006/064590
§ 371 (c)(1),
(2), (4) Date: Aug. 4, 2009

(87) PCT Pub. No.: WO2007/012632
PCT Pub. Date: Feb. 1, 2007

(65) Prior Publication Data
US 2010/0008834 A1 Jan. 14, 2010

(30) Foreign Application Priority Data
Jul. 25, 2005 (DE) .................. 10 2005 034 642

(51) Int. Cl.
*B01F 15/06* (2006.01)
(52) U.S. Cl. .................. 165/11.1; 366/142; 366/149
(58) Field of Classification Search .................. 366/142, 366/149; 165/11.1, 11.2
See application file for complete search history.

(56) References Cited

U.S. PATENT DOCUMENTS
| | | | | | |
|---|---|---|---|---|---|
| 2,766,442 | A | * | 10/1956 | Meyer | 165/11.1 |
| 4,270,049 | A | * | 5/1981 | Tanaka et al. | 250/227.25 |
| 2003/0003024 | A1 | | 1/2003 | Zech et al. | |
| 2004/0148858 | A1 | | 8/2004 | Yamamoto et al. | |

FOREIGN PATENT DOCUMENTS
| | | |
|---|---|---|
| EP | 1 217 099 A2 | 6/2002 |
| EP | 1 232 785 A2 | 8/2002 |
| WO | WO 2004/091773 A1 | 10/2004 |

* cited by examiner

*Primary Examiner* — David Sorkin

(57) ABSTRACT

There is described a microfluid system with a microchannel structure for the passage of fluids and a further channel structure separated from the microstructure by means of at least one separating wall for the passage of a heat transfer fluid. The risk of internal leakage in the microfluid system can be recognized in time, by separation of the microchannel structure from a cavity of at least one point by a further separating wall, said separating wall being at least locally weaker than the separating wall between the microchannel structure and the further channel structure and said cavity is connected to a detector device for detection of ingressing fluid.

20 Claims, 1 Drawing Sheet

MICROFLUIDIC SYSTEM

CROSS REFERENCE TO RELATED APPLICATIONS

This application is the US National Stage of International Application No. PCT/EP2006/064590, filed Jul. 24, 2006 and claims the benefit thereof. The International Application claims the benefits of German application No. 10 2005 034 642.1 DE filed Jul. 25, 2005, both of the applications are incorporated by reference herein in their entirety.

FIELD OF INVENTION

The invention relates to a microfluidic system, comprising a microchannel structure for conducting fluids and a further channel structure, separated from the microchannel structure by means of at least one separating wall, for conducting a heat transfer fluid.

BACKGROUND OF INVENTION

A microfluidic system of this type, known from EP 1 217 099, forms a microreactor in which the microchannel structure for the fluids to be mixed (educts) and the reaction product are fashioned in a first plate and the further channel structure for the heat transfer fluid is fashioned in a further plate. The two plates are joined with a third plate, which forms a separating wall between the microchannel structure and the further channel structure, inset between them. The heat transfer fluid is temperature-controlled, i.e. heated or cooled, externally.

SUMMARY OF INVENTION

In order to ensure a good transfer of heat, the separating wall between the product side and the heat-exchanger side has to be fashioned so as to be as thin as possible. In chemical reactions, particularly at high reaction temperatures, corrosion frequently occurs on the inside walls of the microchannel structure. Leakages to the outside can be detected by the egress of chemicals. As reactions are generally carried out in fume chambers with forced ventilation, the risk for the operator is relatively small. If, on the other hand, leaks occur between the heat-exchanger side and the product side and if in the process chemicals overflow into the heat-exchanger circuit, then the chemicals may possibly be evaporated in the thermostat outside the fume chamber, as a result of which the operator may be exposed to the vapors of toxic substances. In addition, faults can occur in the transfer of heat and/or the chemical reaction if chemicals enter the heat-exchanger circuit or if the heat transfer fluid enters the microchannel structure of the microreactor.

An object of the invention is therefore to detect the risk of internal leakages in a temperature-controlled microfluidic system promptly.

The object is achieved according to the invention in that in the microfluidic system of the type specified in the introduction the microchannel structure is separated at at least one point by a further separating wall from a cavity, in that the further separating wall is fashioned so as to be at least locally weaker than the separating wall between the microchannel structure and the further channel structure and in that the cavity is connected to a detector device for detecting ingressing fluids.

The further separating wall consequently forms a predetermined rupture point which, in the event of corrosion in the microchannel structure, will be destroyed first. In this case, the fluid will flow out of the microchannel structure into the cavity where it will be detected by means of the detection device. As a result of detection, an alarm signal can be generated and/or the current reaction process shut down automatically.

A large number of different detection principles are eligible for detecting the fluid ingressing into the cavity. These include, among others, thermoanemometry, in which a hot wire is cooled by the ingressing fluid, measurement of the change in electrical conductivity or capacitance in the cavity caused by the ingressing fluid, optical measurement methods such as turbidity measurement, ultrasound for detecting changes in the propagation of sound in the cavity due to the ingressing fluid, etc.

Preferably, a simple and thus low-cost detection principle such as, for example, thermoanemometry, conductivity or capacitance measurement, will be applied so that the detector device can be arranged directly in the cavity. Since in the event of a fault microfluidic systems cannot be repaired, the detector device should also be a low-cost, disposable part.

Alternatively, the cavity can be fashioned as a channel to which the detector device, then preferably arranged outside the actual microfluidic system, for example in a pressure-sealed encapsulation or in a layer of a multilayer structure containing the microfluidic system, is connected.

The further separating wall serving as a predetermined rupture point can be fashioned in different ways so as to be weaker than the separating wall between the microchannel structure and the further channel structure. Preferably, the further separating wall is fashioned so as to be thinner than the separating wall between the microchannel structure and the further channel structure. Alternatively or additionally, it can be weakened by means of chemical pre-treatment or by means of radiation treatment.

Since microfluidic systems generally have to satisfy certain compression strength requirements, the minimum admissible wall thickness of the separating wall between the microchannel structure and the further channel structure has a lower limit: the smaller the widths of the channels on both sides of the separating wall, the smaller the wall thickness can be. Preferably, therefore, the width of the cavity on the one side of the further separating wall is less than the width of the channel of the microchannel structure on the other side, so that the wall thickness of the further separating wall can be reduced without there being a risk of it being destroyed by the test pressure in a pressure test.

In order to increase safety and reliability in the detection of a risk to the microfluidic system from corrosion or in order to be able to monitor a plurality of critical points, a redundant arrangement of further separating wall, cavity and detector device can be provided at least one further point of the microchannel structure. The weaknesses of the further separating walls between the microchannel structure and the various cavities can be the same or different. If at a first of two or more predetermined rupture points an ingress of the fluid into the cavity located respectively therebehind occurs, then firstly an alarm or pre-alarm is generated, whereas when the second or further predetermined rupture points are ruptured, further higher-level alarms are generated or the reaction process in the microfluidic system is automatically shut down and further safety measures, such as for example a purging process, optionally initiated.

The invention is preferably used in such microfluidic systems as are exposed to increased corrosion due to special circumstances such as high temperature, chemical change, etc. The microfluidic system according to the invention is accordingly preferably a microreactor, a micromixer and/or a microretention unit.

BRIEF DESCRIPTION OF THE DRAWINGS

To explain the invention further, reference will be made below to the figures in the drawings, in which in detail.

DETAILED DESCRIPTION OF INVENTION

Figure 1:
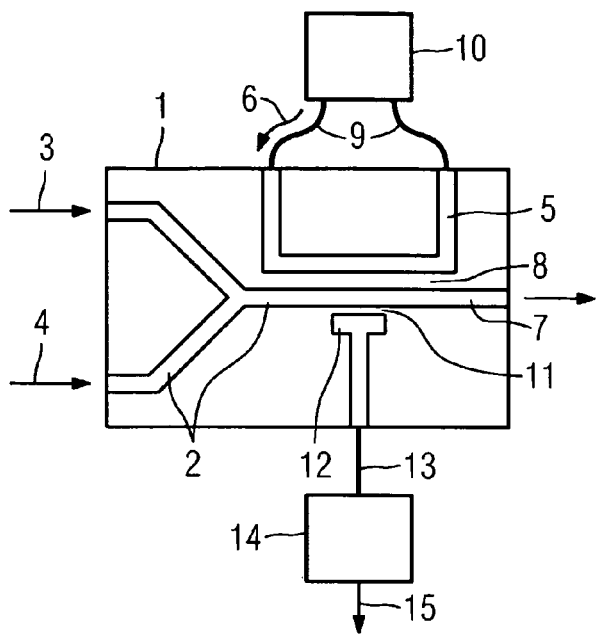
FIG. 1 shows a schematic exemplary embodiment of the microfluidic system according to the invention.

FIG. 1 shows a microfluidic system in the form of a microreactor comprising a one-part or multi-part carrier (substrate) 1, in which a microchannel structure 2 is fashioned for conducting and mixing fluids 3 and 4. The carrier 1 also contains a further channel structure 5 in which a heat transfer fluid 6 flows. In the area of the mixing section 7 of the microchannel structure 2, the microchannel structure is separated from the further channel structure 5 by a thin separating wall 8 having a thickness of just a few tenths of a millimeter. The further channel structure 5 is connected via fluid connections 9, such as hose connections or fluid channels, to a thermostat 10, in which the heat transfer fluid 6 is temperature-controlled—in the case of exothermic reactions of the fluids 3 and 4, cooled.

At one point in the area of the mixing section 7, the microchannel structure 2 is separated by a further separating wall 11 from a cavity 12, also fashioned in the carrier 1. The cavity 12 is fashioned here in the form of a channel and is connected via a further fluid connection 13 to a detector device 14 which is fashioned so as to detect fluids ingressing into the cavity 12. The detection methods that can be considered for this purpose are generally known and will not therefore be explained further. In case of detection, the detector device 14 generates an output signal 15 which can be used to generate an alarm or to initiate further measures such as, for example, the shutting down of the reaction process. The further separating wall 11 is, in comparison with the separating wall 8, fashioned so as to be weaker, here thinner, so that in the event of corrosion inside the microchannel structure 2, destruction of the further separating wall 11 occurs first, before the separating wall 8 is destroyed and fluids can ingress from the microchannel structure 2 into the further channel structure 5 or conversely from the further channel structure 5 into the microchannel structure 2.

Figure 2:
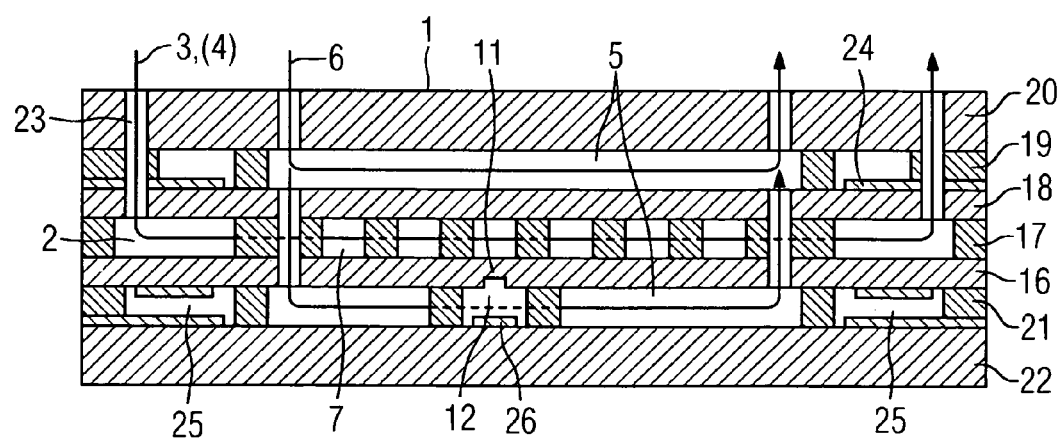
FIG. 2 shows a further exemplary embodiment of the microfluidic system according to the invention, in cross section.

FIG. 2 shows the microreactor in the form of a module for a microfluidic system. On a base plate 16 of the multi-part carrier 1, a structured layer 17 containing the microchannel structure 2 is applied. Alternatively, the microchannel structure 2 can also be introduced on one side of a single plate by means of a suitable micro-engineering method. The microchannel structure 2, which is open on top, is covered with a thin plate 18 which serves as a base plate for a further structured layer containing a part of the further channel structure 5. The layer 19 is covered on top with a further plate 20. The remaining part of the further channel structure 5 is fashioned in an additional structured layer 21 on an additional base plate 22, which on the underside both lie adjacent to the base plate 16. Fluid channels 23, which run perpendicular to the basal surface of the plates and structures 16 to 22 and traverse these correspondingly serve to supply and discharge the fluids 3, 4 and the heat transfer fluid 6 as well as to connect the two parts of the channel structure 5. The plates 16, 18 and 22 carry in part electrical structures which, depending on the design, are temperature sensors 24 or capacitative pressure sensors 25 and serve to measure temperature and pressure of the fluids in the microchannel structure 2.

In the area of the mixing section 7 a cavity 12 is fashioned between the plates 16 and 22, in which cavity an electrical structure 26 is arranged for detecting a fluid ingressing into the cavity 12. This electrical structure 26 may, for example, consist of two electrodes, spaced at a distance from one another, between which the electrical conductivity or capacitance is measured. It may, however, also be a sound converter which measures the sound propagation of the sound waves emitted by it, or a turbidity sensor in the form of a light barrier. The electrical structure 26 forms together with an evaluation device (not shown here) connected downstream thereof the detector device 14. The plate 16 reduced in thickness in the area of the cavity 12 and forms there the predetermined rupture point of the further separating wall. The width of the cavity 12 on the one side of the further separating wall 11 is less than the width of the channel of the microchannel structure 2 on the other side, so that, despite the reduction in thickness of the further separating wall 11, there is no risk of it being destroyed by the test pressure in a pressure test.

The invention claimed is:

1. A microfluidic system, comprising:
   a microchannel structure for conducting fluids;
   a further channel structure, separated from the microchannel structure by at least one separating wall, for conducting a heat transfer fluid;
   a further separating wall to separate the microchannel structure from a cavity, wherein the further separating wall is at least partly weaker than the separating wall between the microchannel structure and the further channel structure; and
   a detector device to detect fluids ingressing in the cavity.

2. The microfluidic system as claimed in claim 1, wherein the detector device is arranged in the cavity.

3. The microfluidic system as claimed in claim 1, wherein the cavity is a channel connected to the detector device.

4. The microfluidic system as claimed in claim 1, wherein the further separating wall is thinner than the separating wall between the microchannel structure and the further channel structure.

5. The microfluidic system as claimed in claim 2, wherein the further separating wall is thinner than the separating wall between the microchannel structure and the further channel structure.

6. The microfluidic system as claimed in claim 3, wherein the further separating wall is thinner than the separating wall between the microchannel structure and the further channel structure.

7. The microfluidic system as claimed in claim 1, wherein the further separating wall is weakened by means of chemical pre-treatment and/or radiation treatment.

8. The microfluidic system as claimed in claim 1, wherein a width of the cavity is less than a channel width of the microchannel structure.

9. The microfluidic system as claimed in claim 4, wherein a width of the cavity is less than a channel width of the microchannel structure.

10. The microfluidic system as claimed in claim 5, wherein a width of the cavity is less than a channel width of the microchannel structure.

11. The microfluidic system as claimed in claim 6, wherein a width of the cavity is less than a channel width of the microchannel structure.

12. The microfluidic system as claimed in claim 1, further comprising a redundant arrangement having of further separating wall, a further cavity and a further detector device at least one further place of the microchannel structure.

13. The microfluidic system as claimed in claim 1, further comprising a supplementary arrangement with a further separating wall, a further cavity and a further detector device at least one further point of the microchannel structure, wherein the weaknesses of the plurality of separating walls is different.

14. The microfluidic system as claimed in claim 9, further comprising a supplementary arrangement with a further separating wall, a further cavity and a further detector device at least one further point of the microchannel structure, wherein the weaknesses of the plurality of separating walls is different.

15. The microfluidic system as claimed in claim 10, further comprising a supplementary arrangement with a further separating wall, a further cavity and a further detector device at least one further point of the microchannel structure, wherein the weaknesses of the plurality of separating walls is different.

16. The microfluidic system as claimed in claim 11, further comprising a supplementary arrangement with a further separating wall, a further cavity and a further detector device at least one further point of the microchannel structure, wherein the weaknesses of the plurality of separating walls is different.

17. The microfluidic system as claimed in claim 1, wherein the microfluid system is a microreactor unit, a micromixer unit or a microretention unit.

18. A micromixer unit, comprising:
    a microchannel structure for conducting fluids;
    a further channel structure, separated from the microchannel structure by at least one separating wall, for conducting a heat transfer fluid;
    a further separating wall to separate the microchannel structure from a cavity, wherein the further separating wall is at least partly weaker than the separating wall between the microchannel structure and the further channel structure; and
    a detector device to detect fluids ingressing in the cavity.

19. The microfluidic system as claimed in claim 18, wherein the detector device is arranged in the cavity.

20. A microretention unit, comprising:
    a microchannel structure for conducting fluids;
    a further channel structure, separated from the microchannel structure by at least one separating wall, for conducting a heat transfer fluid;
    a further separating wall to separate the microchannel structure from a cavity, wherein the further separating wall is at least partly weaker than the separating wall between the microchannel structure and the further channel structure; and
    a detector device to detect fluids ingressing in the cavity.

* * * * *